(12) United States Patent
Beers

(10) Patent No.: US 7,962,994 B2
(45) Date of Patent: Jun. 21, 2011

(54) VACUUM ELECTRONIC SWITCH DETECTION SYSTEM

(75) Inventor: David R. Beers, Dallastown, PA (US)

(73) Assignee: Black & Decker Inc., Newark, DE (US)

( * ) Notice: Subject to any disclaimer, the term of this patent is extended or adjusted under 35 U.S.C. 154(b) by 889 days.

(21) Appl. No.: 11/870,929

(22) Filed: Oct. 11, 2007

(65) Prior Publication Data

US 2009/0094775 A1    Apr. 16, 2009

(51) Int. Cl.
*A47L 9/28* (2006.01)
*H01H 47/20* (2006.01)

(52) U.S. Cl. ............... 15/319; 15/339; 307/38; 307/39; 307/125; 307/129

(58) Field of Classification Search .............. 15/319, 15/339; 307/129, 38, 39, 125; H01H 47/20; A47L 9/28
See application file for complete search history.

(56) References Cited

U.S. PATENT DOCUMENTS

| | | | |
|---|---|---|---|
| 1,864,622 A | 6/1932 | Sutherland | |
| 2,522,882 A | 9/1950 | Lofgren | |
| 2,570,307 A | 10/1951 | Bell et al. | |
| 3,236,032 A | 2/1966 | Yasukawa et al. | |
| 3,320,726 A | 5/1967 | Black, Jr. | |
| 3,591,888 A | 7/1971 | Takeda et al. | |
| 3,656,083 A | 4/1972 | Brook | |
| 3,695,006 A | 10/1972 | Valbona et al. | |
| 3,708,962 A | 1/1973 | Deguchi et al. | |
| 3,936,904 A | 2/1976 | Bashark | |
| 4,021,879 A | 5/1977 | Brigham | |
| 4,070,078 A | 1/1978 | Chrones | |
| 4,266,257 A | 5/1981 | Rudich, Jr. | |
| 4,302,624 A | 11/1981 | Newman | |
| 4,357,729 A | 11/1982 | Vander Molen et al. | |
| 4,398,316 A | 8/1983 | Scott et al. | |
| 4,611,365 A | 9/1986 | Komatsu et al. | |
| 4,628,440 A | 12/1986 | Thompson et al. | |
| 4,654,924 A | 4/1987 | Getz et al. | |
| 4,825,140 A | 4/1989 | St. Louis | |
| 5,072,484 A | 12/1991 | Edlund et al. | |
| 5,099,157 A | 3/1992 | Meyer | |
| 5,120,983 A | 6/1992 | Samann et al. | |
| 5,256,906 A | 10/1993 | Tsuge et al. | |
| 5,265,305 A | 11/1993 | Kraft et al. | |
| 5,276,939 A | 1/1994 | Uenishi et al. | |
| 5,404,612 A | 4/1995 | Ishikawa et al. | |
| 5,541,457 A | 7/1996 | Morrow | |

(Continued)

FOREIGN PATENT DOCUMENTS

EP    0155502    9/1985

OTHER PUBLICATIONS

Talema AC1030, 30 Amp Current Transformer; http://www.talema-nuvotem.com; CT's\AC1030 05-00 (1 page).

*Primary Examiner* — David A Redding

(74) *Attorney, Agent, or Firm* — Harness, Dickey & Pierce, P.L.C.

(57) ABSTRACT

A vacuum electronic switch detection system allows multiple user selectable vacuum modes to be chosen with only one micro-controller input available for performing the multiple selectable modes. The switch detection system provides multiple voltage ratio control signals indicative of multiple switch position possibilities.

9 Claims, 2 Drawing Sheets

U.S. PATENT DOCUMENTS

| | | |
|---|---|---|
| 5,554,917 A | 9/1996 | Kurz et al. |
| 5,596,181 A | 1/1997 | Bach et al. |
| 5,747,973 A | 5/1998 | Robitaille et al. |
| 5,955,791 A | 9/1999 | Irlander et al. |
| 6,008,608 A | 12/1999 | Holsten et al. |
| 6,026,539 A | 2/2000 | Mouw et al. |
| 6,029,309 A | 2/2000 | Imamura et al. |
| 6,044,519 A | 4/2000 | Hendrix |
| 6,131,236 A | 10/2000 | Roth et al. |
| 6,222,285 B1 | 4/2001 | Haley et al. |
| 6,526,622 B2 | 3/2003 | Conrad et al. |
| 6,569,218 B2 | 5/2003 | Dudley |
| 6,625,845 B2 | 9/2003 | Matsumoto et al. |
| 6,758,874 B1 | 7/2004 | Hunter, Jr. |
| 6,946,967 B2 | 9/2005 | Klaus et al. |
| 2004/0177471 A1 | 9/2004 | Jung et al. |
| 2004/0187253 A1 | 9/2004 | Jin et al. |
| 2005/0091784 A1 | 5/2005 | Bone |
| 2005/0120510 A1 | 6/2005 | Weber |
| 2005/0132528 A1 | 6/2005 | Yau |
| 2005/0198766 A1 | 9/2005 | Nam et al. |
| 2005/0217067 A1 | 10/2005 | Rew et al. |

VACUUM ELECTRONIC SWITCH DETECTION SYSTEM

FIELD

The present disclosure relates to vacuum electronics, and more particularly to an electronic switch detection system for a vacuum.

BACKGROUND

The statements in this section merely provide background information related to the present disclosure and may not constitute prior art.

Conventional industrial shop vacuums are employed for both wet and dry usage. However, the electronics for conventional industrial shop vacuums can be primitive in design.

SUMMARY

The present disclosure provides electronics for an industrial shop vacuum that includes a vacuum electronic switch detection system to allow multiple user selectable vacuum modes to be chosen with only one micro-controller input available for performing the multiple vacuum selectable modes. The switch detection method provides multiple voltage ratio control signals indicative of multiple switch position possibilities.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
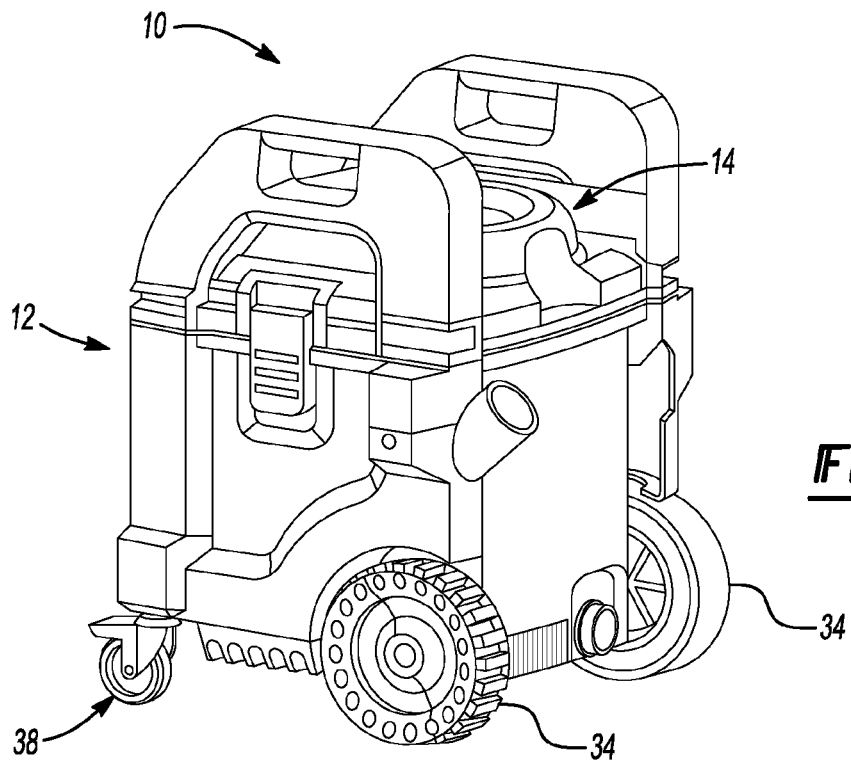
FIG. 1 is a perspective of an industrial shop vacuum according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2:
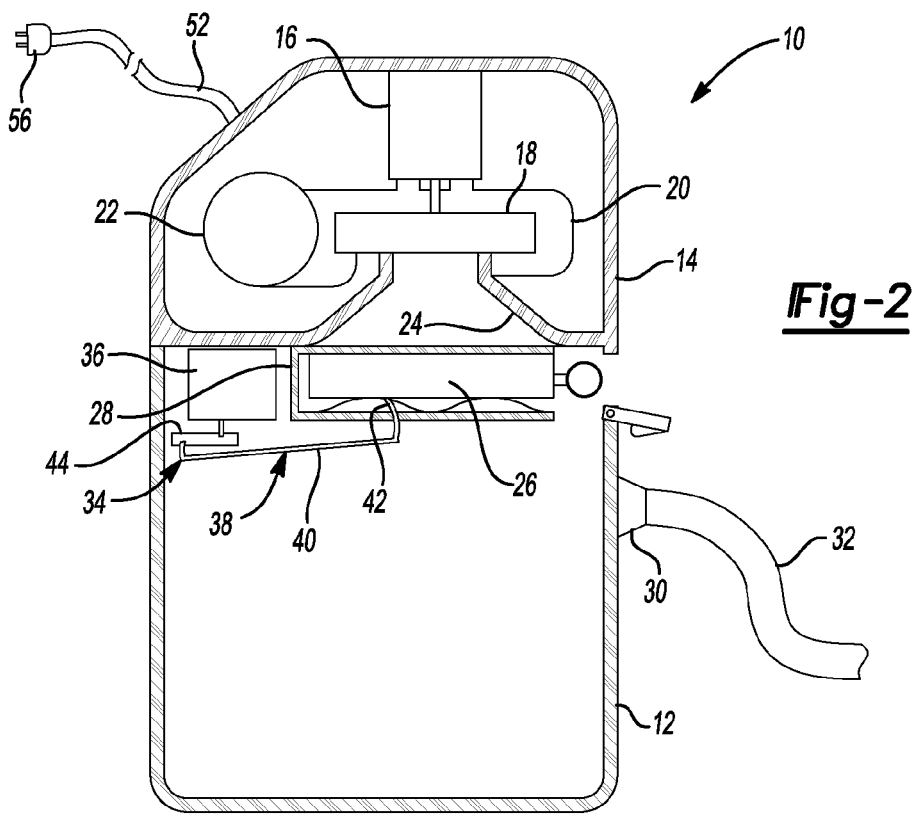
FIG. 2 is a schematic diagram of an industrial shop vacuum according to the principles of the present disclosure.

With reference to FIGS. 1 and 2, an example vacuum 10, according to the principles of the present disclosure, will now be described. The vacuum 10 may include a canister 12 and a vacuum head 14 that closes the canister 12. The vacuum head may support a drive motor 16. The drive motor 16 may support a suction fan 18, which may be provided in a fan chamber 20 of the vacuum head 14. The fan chamber 20 may be in fluid communication with an exhaust port 22 and an intake port 24. The intake port 24 may be covered by a filter assembly 26 situated in a filter housing 28 of a vacuum head 14.

A motor 16, when powered up, may rotate the suction fan 18 to draw air into the suction inlet opening 30 and through the canister 12, through the filter assembly 26, through the intake port 24 and into the fan chamber 20. The suction fan 18 may push the air in the fan chamber 20 through the exhaust port 22 and out of the vacuum 10. A hose 32 can be attached to the inlet opening 30.

The canister 12 can be supported by wheels 34. The wheels 34 can include caster wheels, or the wheels can alternatively be supported by an axle.

A filter cleaning device 34 is provided including a filter cleaning motor 36 drivingly connected to a filter cleaning mechanism 38. The filter cleaning mechanism 38 can take many forms, and can include an eccentrically driven arm 40 having fingers 42 engaging the filter 26. The filter cleaning device 34 can be driven to traverse across the filter 26 to cause debris that is stuck to the filter to be loosened up and fall into the canister 12. The arm 40 is connected to an eccentric drive member 44 which is connected to motor 36 and, when rotated, causes the arm 40 and fingers 42 to traverse across the surface of the filter 26.

Figure 3:
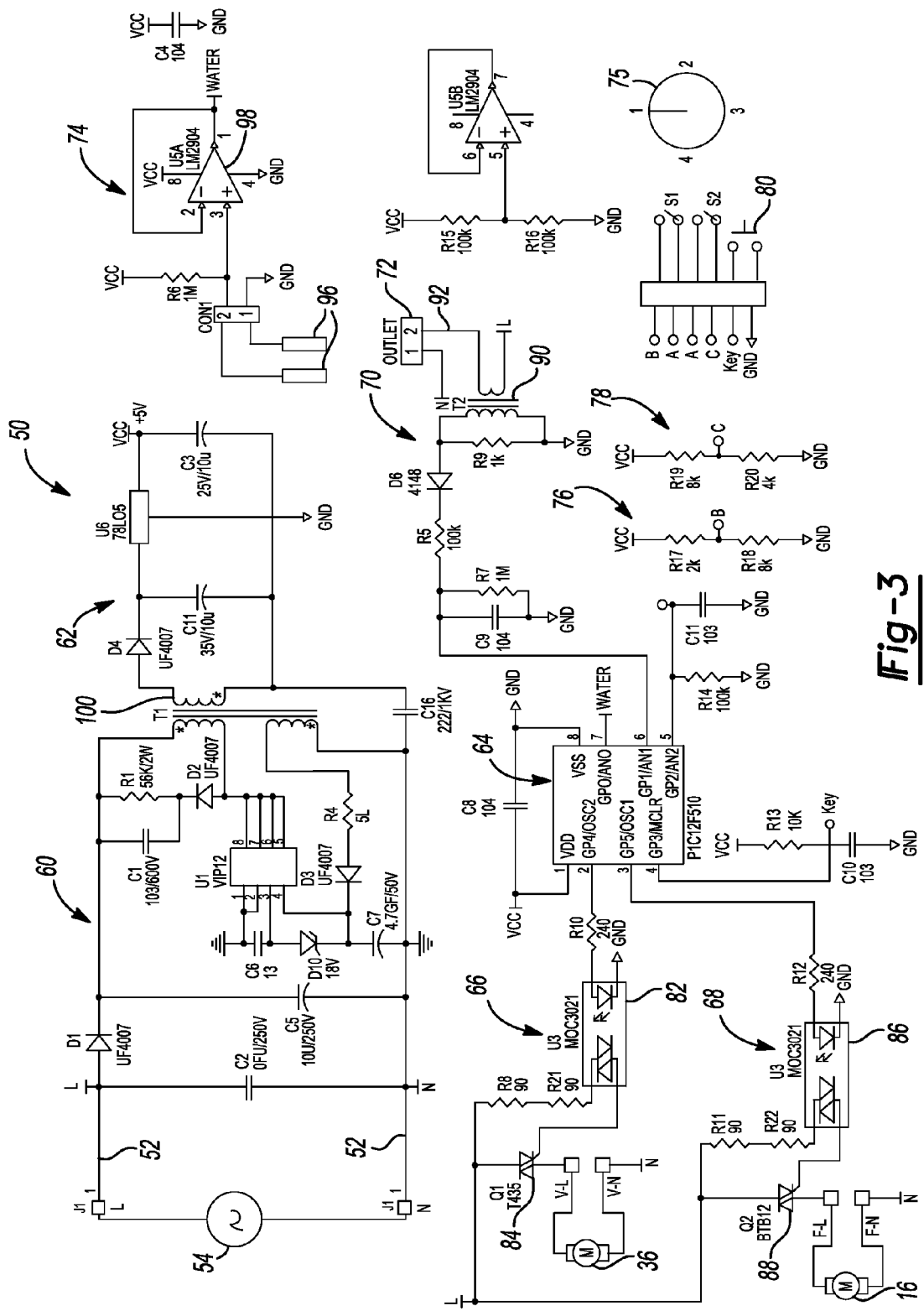
FIG. 3 is a schematic circuit diagram for the electronic controls according to the principles of the present disclosure.

With reference to FIG. 3, a schematic diagram of the electronics 50 utilized to operate the vacuum 10 will now be described. The electronics 50 generally include a power cord 52 extending from the vacuum and adapted for connection with an AC power source 54. In particular, the power cord 52 can include a plug 56 having a two-prong or three-prong connection as is known in the art, as is shown in FIG. 2. The power cord 52 is connected to a power source circuit 60. An electrical isolation circuit 62 is provided in communication with the power source circuit 60 for providing a low voltage output VCC, as will be described in greater detail herein. A microcontroller 64 is provided in communication with the electrical isolation circuit 62 for receiving a low voltage supply VCC therefrom. The microcontroller 64 provides control signals to a filter cleaning circuit 66 and a vacuum circuit 68.

A power tool sense circuit 70 is provided in communication with the microcontroller 64 for providing a signal to the microcontroller 64 regarding operation of a power tool that is plugged into an outlet 72 that can be disposed on the power tool 10. The outlet 72 can be connected to the power cord 52 as indicated by nodes L, N. A water sense circuit 74 is provided in communication with the microcontroller for providing a signal ("water") to the microcontroller 64 that the water level in the canister 12 has reached a predetermined level for deactivating the vacuum source in order to prevent water from being drawn into the vacuum filter 26.

A multi position switch such as four position rotary switch 75 can be utilized for providing different activation states of a first micro-switch S1 and a second micro-switch S2 for controlling operation of the vacuum motor 16. The switches S1 and S2 are connected to connectors A, B and A, C, respectively, wherein connectors B and C are connected to ratio circuits 76, 78, respectively. Connector A provides an input signal to the microcontroller 64 indicative of the activation state of micro-switch S1 and micro-switch S2 in order to provide four modes of operation utilizing the two micro-switches S1 and S2 while providing just a single input into the microcontroller 64. Table 1 provides a list of the mode selection possibilities of the four position user switch 75 with micro-switches S1 and S2 in the different activation states.

TABLE 1

| User Switch Position | S1 | S2 | Microcontroller Input VCC Ratio |
|---|---|---|---|
| 1 | 0 | 0 | 0 * VCC |
| 2 | 0 | 1 | (1/3) * VCC |
| 3 | 1 | 0 | (4/5) * VCC |
| 4 | 1 | 1 | (5/8) * VCC |

With each of the four possible activation states of microswitches S1 and S2, the ratio circuit 76, 78 provide different ratio input signals as a function of the low voltage supply VCC. In particular, by way of example as shown in Table 1, when both switch S1 and switch S2 are open, a zero ratio VCC signal is received by the microcontroller 64. When switch S1 is open and switch S2 is closed, a 1/3 ratio VCC signal is provided. When the switch S1 is closed and switch S2 is open, a 4/5 VCC ratio signal is provided, and when both switches S1 and S2 are closed, a 5/8 VCC ratio signal is provided to the microcontroller 64. The ratios are determined by the resistance levels of resistors R17-R20 provided in the ratio circuits 76, 78. Ratios, number of switches, and number of resistors can vary for inputs other than 4. With these four input signals provided at a single microcontroller input, four user selectable modes are provided, thereby simplifying the microcontroller input and reducing the cost of the microcontroller.

The four user selectable modes can include position (1) vacuum off, power outlet is off, auto filter clean is off and filter clean push button is off; position (2) vacuum on, power outlet is off, auto filter clean is off and filter clean push button is on; position (3) vacuum on, power outlet off, auto filter clean is on and filter clean push button is on; and position (4) (auto mode) vacuum is controlled by outlet, auto filter clean is on and filter clean push button is on. These operation modes are exemplary and different modes can be enabled and disabled by the microcontroller 64. Further, more or fewer switch positions can also be employed as well as more micro-switches and ratio circuits can also be utilized that are activated by the user switch for providing even further distinct operation modes.

A filter clean switch 80 is also provided for providing a signal to the microcontroller 64 for operating the filter cleaning device via activation of the filter cleaning circuit 66. The filter cleaning circuit 66 includes an opto-coupler 82 which can be activated by a low voltage signal from the microcontroller 64. The opto-coupler 82 provides an activation signal to a triac 84. The triac 84 is an electronic switch similar to anti-parallel SCRs. When the gate of the triac 84 is held active, the triac 84 conducts electricity to the filter cleaning motor 36 for activating the filter cleaning device 34. The opto-coupler 82 requires only a low power input for holding the triac 84 active. Additionally, the triac may be held continuously active for a time period then turned inactive, or pulsed active/inactive for a timer period, or the triac may be replaced by an SCR and driven with DC in a similar manner just described. The auto filter clean mode will turn off the vacuum for a brief period while the filter cleaning device 34 moves across the filter pleats. This can occur at predetermined intervals while the vacuum is operated continuously and every time the vacuum is turned off. The filter clean push button mode, when activated by user switch 75 and be pressing the push button 80, will cause the vacuum to turn off for a brief period while the filter cleaning device 34 is operated to move across the filter pleats.

The microcontroller 64 can also provide a control signal to the vacuum circuit 68. The vacuum circuit 68 is provided with an opto-coupler 86 which receives a low voltage signal from the micro-controller 64. The opto-coupler 86 can provide an activation voltage to a triac 88 which is held active by the voltage supplied by the opto-coupler 86 to provide electricity to the vacuum motor 16. The opto-coupler 86 requires only a low power input for holding the triac 88 active.

The power tool sense circuit 70 is provided with a current transformer 90 that senses current passing through an electrical connection to the power outlet 72 that supplies power to a power tool that can be plugged into the power outlet 72. The current transformer 90 provides a signal to the microcontroller 64 indicative to the activation state of a power tool plugged into the outlet 72. In response to the power tool sense circuit 70, the microcontroller 64 can automatically activate the vacuum motor 16 for driving the vacuum source. Thus, when a power tool is plugged into the outlet 72 and is activated by a user, the vacuum motor 16 can be activated to assist in vacuuming debris that is created by the use of the power tool. The microcontroller 64 can delay deactivation of the vacuum motor 16 after the power tool is deactivated, to allow for the vacuum 10 to collect debris for a predetermined period of time after the power tool is deactivated.

The water sense circuit 74 includes a pair of water sense probes 96 disposed within the canister 12 of the vacuum 10. Probes 96 can be connected to vacuum head 14 and can be suspended within the canister 12 below the level of the filter 26. A buffer device 98 buffers the high impedance water sense input. The microcontroller on its own is unreliable in measuring the high impedance water sense input. The output of the buffer device or amplifier 98 goes to an analog input to the microcontroller 64. The microcontroller software determines the analog level to detect water sense. The water sense probes 96 can be brass probes mounted in the vacuum's canister 12. Water contacting between the probes will be detected by the water sense circuit 74 as a lower impedance.

The electrical isolation circuit 62 is provided to eliminate shock hazard. Three components provide isolation including the power supply transformer 100 as well as the current transformer 90 and the opto-couplers 82, 86. The power supply transformer 100 provides a reduced voltage output from the power source 54. By way of example, a five volt reduced power supply VCC can be provided by the electrical isolation circuit 62 from the AC line voltage source 54. The circuit 60 previous to the transformer is the control circuit for the switching supply. The transformer provides isolation and is part of the switching supply. The five volt regulator takes the isolated control circuit output and reduces it to +5V regulated.

The low voltage power supply VCC is utilized by the microcontroller 64 for providing signals to the opto-couplers 82, 86 of the filter cleaning circuit 66 and vacuum circuit 68 as well as supplying power to the water sense circuit 74. Furthermore, the ratio switch circuits 76, 78 are supplied with the low voltage VCC power supply.

What is claimed is:

1. A vacuum comprising:
    a housing;
    a vacuum source disposed in said housing;
    a vacuum filter disposed in said housing upstream of said vacuum source;
    an on-board power outlet mounted to said housing and including a power tool sense circuit for sensing the operation of a power tool plugged into said on-board power outlet;
    a multi-position switch mounted to said housing, said multi-position switch having at least three switch positions and including a first micro-switch and a second micro-switch which provide different activation states depending upon the position of the multi-position switch, the micro-switches having separate first connectors and a second connector common to the first and second micro-switches;
    a power source in communication with said first and second micro-switches via first and second separate ratio circuits coupled to the respective first connectors, the first and second ratio circuits providing differing ratio signal outputs depending upon differing activation states of said first and second micro-switches; and a controller connected to said first and second ratio circuits and said first and second micro-switches via only the second common connector and providing multiple control signals for activating said vacuum source based upon input from said first and second ratio circuits and said power tool sense circuit.

2. The vacuum according to claim 1, wherein said ratio circuits provide at least three different ratio signals indicative of at least three different activation states of said first and second micro-switches.

3. The vacuum according to claim 2, wherein said controller deactivates said vacuum source responsive to a first ratio signal, said controller activates said vacuum source responsive to a second ratio signal while the power outlet is deactivated, and said controller activates said power outlet and activates said vacuum source in response to a detected operation of a power tool by said power tool sense circuit and in response to a third ratio signal.

4. The vacuum according to claim 3, wherein the controller receives the ratio signals from the ratio circuits in cooperation with the first and second micro-switches via a single input from only the second common connector.

5. The vacuum according to claim 3, wherein the multi-position switch includes a four position switch and the ratio circuits provide at least four different ratio signals depending upon the different activation states of the first and second micro-switches.

6. The vacuum according to claim 1, wherein the controller is configured to delay deactivation of the vacuum source for a predetermined period of time after receiving a signal indicative of the power tool being deactivated.

7. The vacuum according to claim 1, wherein the power source is in communication with the first and second ratio circuits independent of an activation state of the first and second micro-switches.

8. The vacuum according to claim 1, wherein the first and second ratio circuits each include resistors having different resistance levels.

9. The vacuum according to claim 1, wherein the first and second ratio circuits are directly coupled to the respective first connectors of the first and second micro-switches.

* * * * *